May 21, 1968     M. MOSS     3,383,982

PHOTOELECTRIC FOLLOWUP SYSTEM

Filed April 22, 1965     2 Sheets-Sheet 1

INVENTOR
Mortimer Moss
By Polachek & Saulsbury
ATTORNEYS.

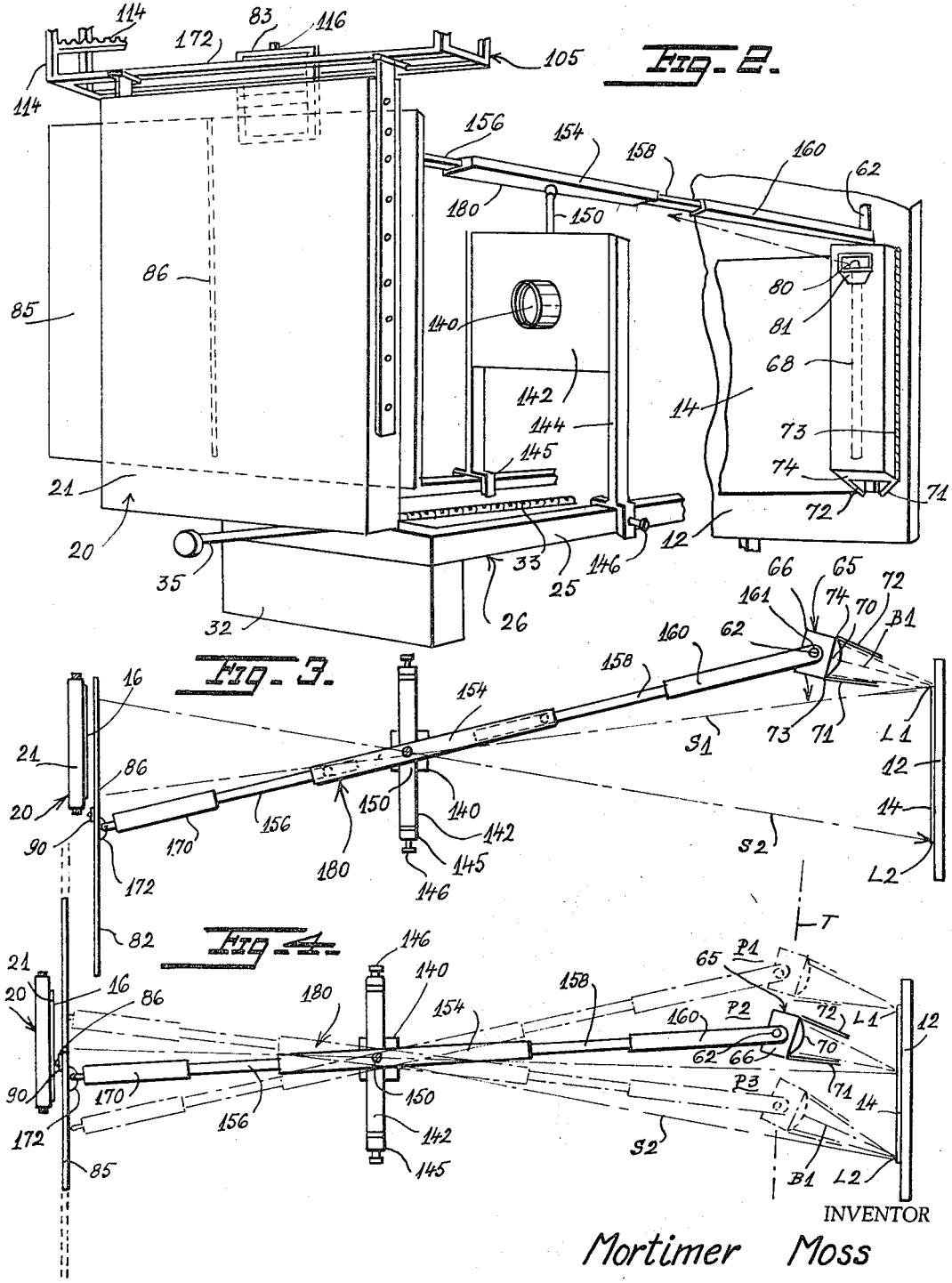

United States Patent Office 3,383,982
Patented May 21, 1968

3,383,982
PHOTOELECTRIC FOLLOWUP SYSTEM
Mortimer Moss, 133—01 N. Hempstead Ave.,
Flushing, N.Y. 11355
Filed Apr. 22, 1965, Ser. No. 449,944
9 Claims. (Cl. 88—24)

ABSTRACT OF THE DISCLOSURE

A photoelectric followup system for a camera or the like employing a motor driven slit shutter and scanning lamp. The shutter and scanning lamp are driven by separate electric motors which motors are controlled by switching circuit including photoelectric control means. According to the system a shutter plate is provided with a long narrow opening or slit through which light emitted by a lamp is transmitted from an object being photographed or scanned. The transmitted light passes through the slit and impinges upon a photosensitive sheet supported behind the shutter plate. The shutter plate and lamp are moved in coordination so that a single elemental narrow area of the object being scanned is photographed at a time. The object scanned can be a picture or graphic copy on transparent film, and the scanning light can be transmitted through the film.

This invention concerns an object scanning system including a motor driven slit shutter and scanning lamp for a camera, photocopy machine, copy scanner and the like.

According to the invention a shutter plate is provided with a long, narrow opening or slit through which light emitted by a lamp is transmitted from an object being photographed or scanned. The transmitted light passes through the slit and impinges upon a photosensitive sheet supported behind the shutter plate. The shutter plate and lamp are moved in coordination so that a single elemental narrow area of the object being scanned is photographed at a time. The object scanned can be a picture or graphic copy on transparent film, and the scanning light can be transmitted through the film.

The invention can be installed in many types of cameras and can be adapted to existing equipment. The invention can be used in photographing three dimensional objects as well as flat copy. The scanning lamp is readily accessible and is adjustable for variable quality and direction of light. A photocell controlled switching means is included in the system for turning on and off automatically the drive motors of the shutter plate and scanning lamp, and for turning on and off automatically the lamp illuminating the object being photographed. The scanning lamp can be provided with a cylindrical lens to concentrated line in a long narrow area on the object scanned. A filter or screen can be placed over the shutter slit. The shutter plate may be made to vibrate in its plane perpendicular to its direction of travel to eliminate possible streaking when a filter or screen is used. The shutter opening may have multiple slits. The scanning light may have twin lamps. The filter placed over the shutter opening or slit may be a transparent container of colored liquid. The invention can be used on step and repeat machines of the projection type. The strong concentration of light in a long narrow area on the object is advantageous when slow films are used, or when the object is heavily masked. The invention can be installed in cameras used in making lithographic plates.

The relatively slow progressive movement of the scanning light across the object with light concentrated only on a narrow area at any one time makes it possible to illuminate the object with a greater light intensity per unit area than would be possible if the light were uniformly distributed over the entire area of the object. Furthermore, a considerable saving in expense for electric power is effected since only a given size lamp which would be inadequate for lighting the entire area of an object can be used to illuminate an object scanned substantially line-by-line, in the present invention. A further advantage is that the copy or object being scanned is not subjected to the light and heat of scanning lamps over its entire area during the entire scanning processes. This avoids deterioration of scanned objects which may be sensitive to light and heat.

It is therefore a principal object of the invention to provide a scanning system for a camera or the like employing a motor driven slit shutter and scanning lamp.

A further object is to provide a scanning system as described where the shutter and scanning lamp or lamps are driven by separate motors.

Still another object is to provide a scanning system as described wherein the scanning lamp and drive motors for the scanning lamp and shutter are actuated by a switching circuit including photoelectric control means.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 3 and FIG. 4 are diagrammatic plan views illustrating the coordinated shutter and lamp moving scheme of the apparatus of FIGS. 1 and 2.

FIG. 5 is a diagram of an electric circuit employed in the system.

Figure 1:
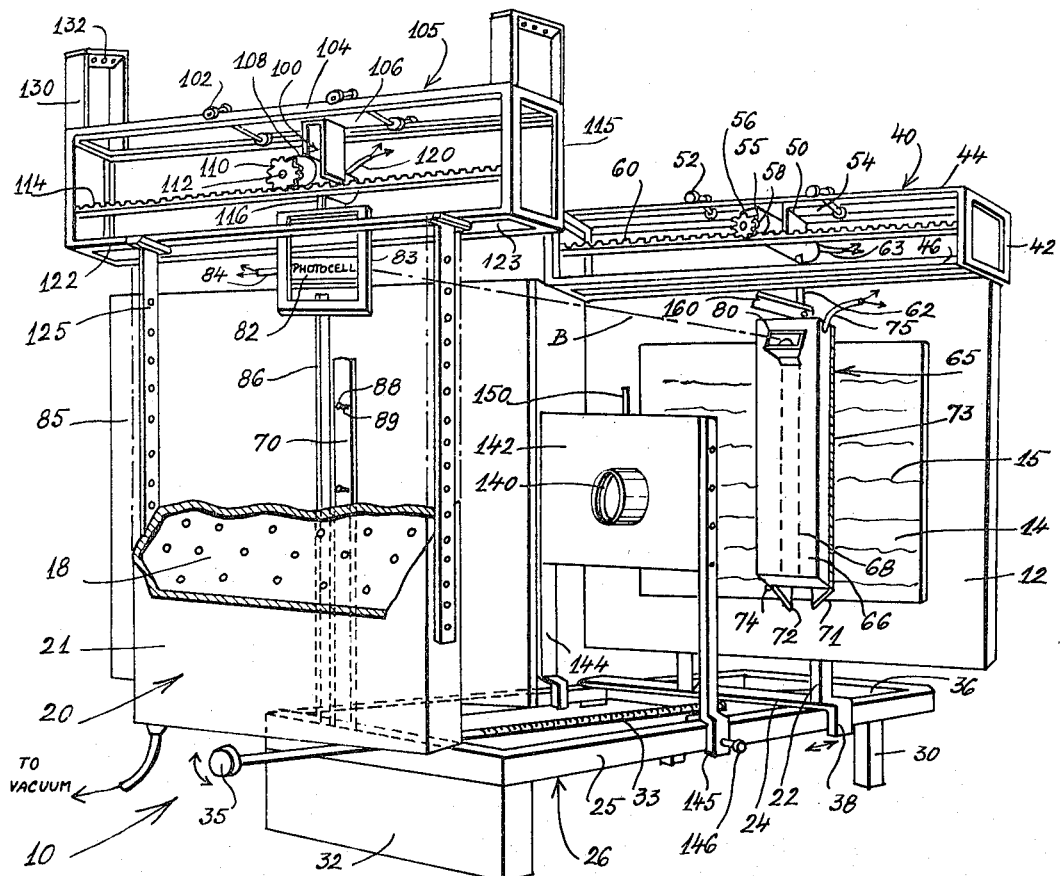
FIGURE 1 is a perspective view of apparatus embodying the invention, parts being broken away.
Figure 2:
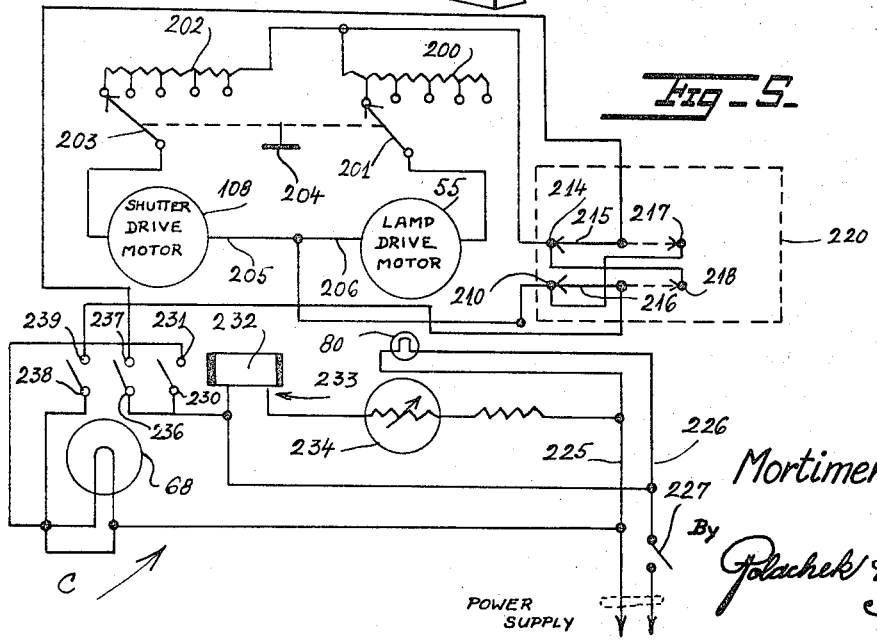
FIG. 2 is a perspective view of the apparatus with other parts broken away.

Referring first to FIGS. 1 and 2, there are shown parts of a camera 10. The camera includes a vertical copy board 12 on which is shown mounted a rectangular copy sheet 14. Subject matter 15 on this sheet can photograph on film 16 indicated schematically in FIGS. 3 and 4. The film is supported by a copy holder 20 including a perforated plate 18 forming one side of a casing 21 in which a suction is maintained. The suction holds the film 16 in position on plate 18. Plate 18 is shown vertical and parallel to the copy board 12.

Copy board 12 is supported by legs 22 on a cross bar 24 extending transversely of side rails 25 in a horizontal rectangular frame 28. The frame is carried on rear legs 30 and a front vertical end wall 32. The copy board 12 is movable back and forth horizontally on frame 26 by means of a horizontal threaded shaft 33 engaged in a threaded hole in cross bar 24. The front end of the shaft has a knob or handle 35 to facilitate turning the shaft. The rear end of the shaft is rotatably anchored in rear end wall 36 of the frame 26. U-shaped flanges 38 at outer ends of bar 24 extend around the side rails 25 and serve to guide the bar in sliding back and forth relation on the frame carrying the copy board.

Mounted on top of the copy board is a horizontal rectangular frame work 40. This frame work includes rectangular end frames 42, two top rails 44 and two bottom rails 46. This forms a rigid box-like frame structure. Movably mounted on top of rails 44 is a carriage 50 having four flanged wheels 52 riding on the rails. The carriage has a horizontal plate 54 from which is suspended a variable speed reversible electric motor 55. This motor includes a speed reducing gear box with a drive shaft 56 on which is a spur gear 58 meshed with a horizontal rack gear 60 extending between frames 42. The motor is connected to a control circuit via a flexible cable 63.

Suspended from the motor by an axially vertical bar 62 is a lamp fixture 65 including a rectangular casing 66 in which is an elongated tubular lamp 68 indicated by dotted lines in FIGS. 1 and 2. In front of the lamp is a cylindrical lens 70 shown in FIGS. 3 and 4 by means of which the light emitted by the lamp is projected as a long narrow beam upon the copy board. The fixture has a pair of light shield plates or louvers 71, 72 carried by hinges 73, 74 at edges of the casing 66 and adjustable so that light emitted by the lamp is confined to the concentrated long narrow beam on the copy board. The lamp is connected via flexible cable 75 in the control circuit of the system.

Mounted on casing 66 and facing forwardly as shown in FIGS. 1 and 2 is a projection lamp 80. This lamp has a flared shade 81 which limits the spread of the light beam B to a wide, flat horizontal field above film holder 20. The light from lamp 80 impinges on a photocell mounted in a housing 82 in the control circuit of the system. Housing 82 is mounted in a rectangular frame 83 which supports a rectangular, vertical shutter 85. The shutter is in the form of a plate having a vertical centrally located slit 86. The width of the slit can be adjusted by a vertical slat 90 held by pins 88 inserted in slots 89 in the slat. The slat can be moved laterally to cover more or less of the slot 86 to adjust the width of the long narrow light beam cast upon the photographic film or plate supported on the rear or perforated side plate 18 of the film holder 20.

The shutter 85 is movable horizontally in its vertical plane. This is accomplished by a carriage 100 having four flanged wheels 102 riding on top rails 104 of another rectangular frame work 105 similar to frame work 40. The carriage has a horizontal plate 106 from which is suspended a variable speed reversible electric motor 108. The motor drives a spur gear 110 through a speed reducer included in its casing having a drive shaft 112 on which gear 110 is mounted. Gear 110 is meshed with a horizontal rack gear 114 supported by rectangular end frame 115 of the frame work 105. An axially vertical bar 116 depends from the motor and is connected to frame 83. The motor is connected to the control circuit of the system by a flexible cable 120. As the carriage 100 moves along the upper rails, the frame 83 and bar 116 move horizontally in a vertical plane between lower horizontal frame bars or rails 122, 123. The shutter is thus carried along parallel to the vertical plane of the film holder 20. The shutter can move from right to left and from left to right since the motor 108 is reversible. Motor 55 which drives the lamp fixture 65 is also reversible as above mentioned so that the lamp fixture can also be driven from left to right and right to left.

The film holder 20 is stationary and supported by vertical end bars 125 secured to the bottom of forward rail 122. The frame work 105 is supported by vertical corner posts or bars 130, and apertured cross bars 132 from a stationary overhead support (not shown).

A lens 140 supported on a vertical shield plate 142 in an axially horizontal position between the copy board and film holder is shown. The plate 142 is supported by vertical end posts 144 on the horizontal frame rails 25. Bottom ends of the posts are formed as U-shaped flanges 145 which can be fixed in place on the rails 25 by bolts 146.

Extending upwardly from plate 142 in alignment with the vertical axial plane of the lens and optical center thereof is a rod 150. This rod pivotally supports a tubular guide member 154. Slidably fitted in each end of guide member 154 are two pistons 156, 158. Rear piston 158 is connected to a horizontal bar 160 having a hole 161 at its rear end through which extends bar 62. The guide member 154 can pivot on rod 150. The rear end of bar 160 is pivotally engaged on bar 62.

A forward horizontal bar 170 is connected at its rear end to piston 156 in axial alignment therewith. The front end of the bar 170 is pivotally engaged with a bracket 172 at the rear side of shutter 85. This bracket is slightly offset from the slit 86 for reasons to be explained in connection with FIGS. 3 and 4.

When refocusing of the lens is necessary for changing the amount of enlargement or reduction effected when the copy sheet 14 is photographed on film 18, bolts 146 are loosened. Then the plate 142 is moved forwardly rearwardly and the bolts are then retightened. The optical axis of the lens is horizontal and disposed in the central vertical planes of both copy board 14 and the film holder 21. When the plate 142 is moved, the tubular guide member 154 is also displaced, this causes either one of the pistons 156, 158 to slide axially further into member 154 while the other piston slides further out of member 154.

By the arrangement of tubular member 154, pistons 156, 158 and the connecting bars 160, 170 there is provided a telescopic straight arm 180 connecting the movable shutter and movable lamp fixture. This performs a very important function which will be best understood from a study of FIGS. 3 and 4.

It will be noted that beam B1 emitted by the lamp fixture 65 is concentrated at a narrow area of line L1 at the left or distal edge of copy sheet 14. The lamp fixture is so supported by bar 62 that the casing 66 and louvers 71, 72 are clear of the optical line of sight S1 which then extends from the left edge of the copy sheet through the lens 140 and slit 86 to the right or proximate edge of film 16. The axis of the telescopic arm 180 is turned beyond the sight line S1. Sight line S1 is coincident with the line of L1 where light beam B1 impinges. As illustrated in FIG. 4, the lamp fixture is carried in a straight path T which is parallel to the copy board 12, through the solid line center position P2 of the lamp fixture. The lamp fixture moves from position P1 through position P2 to position P3 and returns to position P1 in the same straight path. At all positions of the lamp fixture the angular orientation beam B1 with respect to the copy board 12 is fixed, so that the lamp fixture will always remain out of the way of the path of reflected light passing through the lens and shutter slit. When the lamp fixture is as position P3, the illuminated narrow area or line L2 will be the area of coincidence of sight line S2 and beam B1. As the lamp fixture and shutter move in opposite directions parallel to each other, the telescopic arm 180 turns angularly on rod 150 while the pistons 156, 158 alternately slide in and out in guide member 154.

It will be understood that the lamp fixture and shutter will traverse their paths in equal times. When the paths are equal, which occurs only when the optical center of lens 140 is exactly midway between the copy sheet 14 and film 16, then the motors 55 and 108 will be driving carriages 50 and 100 at equal speed. At all other positions of the lens, the path of shutter 85 will be longer than the path of lamp fixture 65 when the camera is enlarging the subject matter 15 on copy sheet 14, or the path of the shutter will be shorter than the path of the light fixture when the camera is reducing the copy on the copy sheet. In the enlarging mode of operation, motor 108 will drive the shutter at a faster speed than the motor 55 drives the lamp fixture. In the reducing mode of operation motor 55 will drive the lamp fixture faster than motor 108 drives the shutter.

While the speeds of the respective motors are determined by their own individual speed settings selected by the operator of the control circuit, it will be found that slight differences in the coordinated relative speeds occur so that the shutter and lamp fixture will tend to oscillate horizontally with respect to each other. These undesired oscillations will cause blurring of the photographed images unless they are suppressed. Supression is accomplished by the telescopic arm 180. The arm 180 connecting the shutter and lamp fixture tends to stabilize the speeds of movement of the shutter and lamp fixture with respect to each other. At any instant, if one motor should tend to speed up this motion will be applied via arm 180 to the other motor to speed up the lagging motor, and vice versa. Thus erratic instantaneous oscillations in the set coordinated speeds of the motors are damped or at least equalized in both motors to suppress the undesired horizontal oscillations of the lamp fixture and shutter.

FIG. 5 shows control circuit C which forms part of the scanning system included in camera 10. The lamp drive motor 55 is connected in series with tapped speed control rheostat 200. Shutter drive motor 108 is connected in series with tapped speed control rheostat 202. The tapping arms 201, 203 of the rheostats are ganged together and operated by a single control 204. It will be noted that the rheostats are oppositely connected so that when motor 55 is driven faster motor 108 is driven slower and vice versa. The speed of the two motors are coordinated at each of the settings of the speed control 204.

Terminals 205, 206 of the motors are connected to contact 210 of a double-pole, double-throw reversing switch 220. Contact 214 of the switch is connected to the high resistance end of rheostat 202 and low resistance end of rheostate 200. The poles 215, 216 of switch 220 are connected to contacts 237, 239 respectively of relay 232. Contacts 236 and 238 of the relay are connected to power lines 226 and 225 which can be connected to a suitable power supply. A manually operable ON-OFF switch 227 is in series with the power supply lines. The motors are connected oppositely so that they rotate in opposite directions and they are reversed when the switch poles 215, 216 are reversed between contacts 210, 214 and contacts 217, 218.

Contacts 217, 218 are cross connected to contacts 210, 217 respectively. Lamp 68 which illuminates the copy board 12 is connected via normally open relay contacts 230, 231 to the power supply line 226. The coil 232 of relay 233 is connected in series with a photoconductive photoelectric cell 234 and power lines 225, 226. Lamp 80 which illuminates the cell 234 is connected across the power supply lines 225, 226.

In operation of circuit C, the operator of the system will set rheostats 200, 202 at selected coordinated settings which may be calibrated in terms of percentage enlargement and reduction of the subject matter on copy sheet 12 which will be effected on film 16. Switch 220 is set to one position or the other depending on whether the lamp fixture is at position P1 or P3. The lamp fixture 65 will be at either edge of the copy sheet. The slot in the shutter will then be located at the corresponding opposite edge of film sheet or plate 16. Then switch 227 is closed which lights lamp 80. This illuminates cell 234. The shade 82 of lamp 80 is set so that photoelectric cell 234 is illuminated by light from lamp 80 only when lamp 68 is required to illuminate the copy sheet. When the light of lamp 80 fails on cell 234, the resistance of cell 234 drops and relay coil 232 closes contacts 230, 236, 238 with contacts 231, 237, 238 respectively. This closes the circuit of lamp 68 and this lamp lights. Also drive motors 205, 206 are started. Carriages 50 and 100 move the lamp fixture and shutter plate in opposite directions. At the end of travel of the lamp fixture 66, the beam B1 from lamp 68 will pass off the copy sheet 14, whereupon the light of lamp 80 will be cut off by its shade 82 from the photoelectric cell 234 and the relay 233 will become deenergized; thus opening the relay contacts and opening the power supply circuits for lamp 68 and motors 55, 108. Lamp 68 will then become extinguished and motors 55, 108 will stop. The lamp 68 thus is lighted only during the photographing cycle and is otherwise turned off automatically. This avoids waste of power, unnecessary heating and lighting of the copy sheet and possible overexposure of the film 16. Also overrun of the motors is prevented. If for any reason the light of lamp 80 gets out or is obstructed, the relay circuit will become deenergized since the light will be cut off from the photoelectric cell. This will open the power supply circuit of the lamp 68. Lamp 68 will go out and motors 55 and 108 will stop. This automatic action prevents overexposure of the film at that position of the shutter slit and lamp fixture, which remain stationary until operation resumes when lamp 80 once again illuminates cell 234.

The camera 10 thus utilizes the coordinated moving slit shutter and copy illuminating lamp to effect line by line scanning of the copy sheet. At the end of travel of the shutter and lamp fixture, switch 227 may be opened by the operator to stop the motors and turn off the lamps 80 and 68. Travel of the carriages, shutter and lamp fixture in opposite directions is effected by manually reversing switch 220.

Although the invention has been described in connection with a particular form of camera, it is applicable in other environments wherever continuous line-by-line scanning is required of a surface, either two dimensional or three dimensional. The entire apparatus can be installed in a darkened room or other enclosure can be provided to shield the copy sheet, film and photoelectric cell from ambient light.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A scanning sysetm for use in a camera or the like, comprising a support for an object to be scanned, a lamp fixture arranged to project a long narrow light beam in a straight image line across said object, first motor means for moving said fixture in a first straight path perpendicular to said straight line, a film holder for supporting photographic film in a plane parallel to said straight line and to said path, a shutter plate supported adjacent to the film holder between the film holder and said object, said plate having a slit therein disposed parallel to said straight line, second motor means for moving said plate in a second straight path parallel to the first path, means coordinating the drive of the motors so that the shutter plate moves in one direction while the lamp fixture moves in an opposite direction and vice versa, a lens, and means supporting said lens between the shutter plate and object for focusing said image line through said slit on said film in all positions of the image line on said object and in all positions of the slit with respect to the copy holder, a telescopic arm pivoted on an axis perpendicular to the optic axis of said lens, said arm having opposite ends pivotally connected the shutter plate and lamp fixture for suppressing relative oscillations of the shutter plate and lamp fixture due to errative variations in relative speeds of the motors.

2. A scanning system for use in a camera or the like, comprising a support for an object to be scanned, a lamp fixture arranged to project a long narrow light beam in a straight image line across said object, first motor means for moving said fixture in a first straight path perpendicular to said straight line, a film holder for supporting photographic film in a plane parallel to said straight line and to said path, a shutter plate supported adjacent to the film holder between the film holder and said object, said plate having a slit therein disposed parallel to said straight line, second motor means for moving said plate in a second straight path parallel to the first path, means coordinating the drive of the motors so that the shutter plate moves in one direction while the lamp fixture moves in an opposite direction and vice versa, a lens, and means supporting said lens between the shutter plate and object for focusing said image line through said slit on said film in all positions of the image line on said object and in all positions of the slit with respect to the copy holder, a projection lamp carried by said lamp fixture directing another beam oppositely from said long narrow beam, a photoelectric cell movable with said shutter plate in a third path for receiving light from the projection lamp, said photoelectric cell being connected in a circuit including a power supply for said lamp fixture whereby said power supply is cut off to extinguish the light of the lamp fixture when the light from said projection lamp moves off said photoelectric cell during relative movement of the shutter plate and lamp fixture.

3. A scanning system for use in a camera or the like, comprising a support for an object to be scanned, a lamp fixture arranged to project a long narrow light beam in a straight image line across said object, first motor means for moving said fixture in a first straight path perpendicular to said straight line, a film holder for supporting photographic film in a plane parallel to said straight line and to said path, a shutter plate supported adjacent to the film holder between the film holder and said object, said plate having a slit therein disposed parallel to said straight line, second motor means for moving said plate in a second straight path parallel to the first path, means coordinating the drive of the motors so that the shutter plate moves in one direction while the lamp fixture moves in an opposite direction and vice versa, a lens, and means supporting said lens between the shutter plate and object for focusing said image line through said slit on said film in all positions of the image line on said object and in all positions of the slit with respect to the copy holder, a telescopic arm pivoted on an axis perpendicular to the optic axis of said lens, said arm having opposite ends pivotally connected to the shutter plate and lamp fixture for suppressing relative oscillations of the shutter plate and lamp fixture due to errative variations in relative speeds of the motors, a projection lamp carried by said lamp fixture directing another beam oppositely from said long narrow beam, a photoelectric cell movable with said shutter plate in a third path for receiving light from the projection lamp, said photoelectric cell being connected in a circuit including a power supply for said lamp fixture, said first motor means and said second motor means, whereby said power supply is cut off to extinguish the light of the lamp fixture and stop said first and second motor means when the light from said projection lamp moves off said photoelectric cell during relative movement of the shutter plate and lamp fixture.

4. A scanning system for a camera or the like, comprising a vertical support for an object to be scanned, a stationary horizontal framework carried by said support, a carriage movable along said framework, a first motor driving said carriage along said framework, a lamp fixture carried by said carriage in a first straight horizontal path parallel to said support, said lamp fixture having a first lamp arranged to project a long narrow light beam in a straight vertical image line across said object, a stationary film holder spaced from said support for holding photographic film in a vertical plane parallel to said support, a second stationary horizontal framework adjacent to said film holder, another carriage movable along the second framework, a second motor driving said other carriage along the other framework, a shutter plate carried by said other carriage in a path parallel to said film holder and adjacent thereto, said plate having a vertical slit therein disposed parallel to said vertical image line, a lens, means supporting said lens between said shutter plate and object for focusing said image line through said slit on said film in all positions of the image line on said object and in all positions of the slit with respect to the copy holder, power supply circuit, and circuit means connecting said motors in said circuit so that the motors drive the carriages in opposite directions at coordinated speeds.

5. A scanning system for a camera or the like, comprising a vertical support for an object to be scanned, a stationary horizontal framework carried by said support, a carriage movable along said framework, a first motor driving said carriage along said framework, a lamp fixture carried by said carriage in a first straight horizontal path parallel to said support, said lamp fixture having a first lamp arranged to project a long narrow light beam in a straight vertical image line across said object, a stationary film holder spaced from said support for holding photographic film in a vertical plane parallel to said support, a second stationary horizontal framework adjacent to said film holder, another carriage movable along the second framework, a second motor driving said other carriage along the other framework, a shutter plate carried by said other carriage in a path parallel to said film holder and adjacent thereto, said plate having a vertical slit therein disposed parallel to said vertical image line, a lens, means supporting said lens between said shutter plate and object for focusing said image line through said slit on said film in all positions of the image line on said object and in all positions of the slit with respect to the copy holder, a power supply circuit, means for adjusting the spacing of said object with respect to the film holder, means for adjusting the position of said lens between the film holder and object for focusing said image line on the film, and circuit means connecting said motors in said circuit so that the motors drive the carriages in opposite directions at coordinated speeds depending on the relative spacing of said object and lens with respect to said film holder.

6. A scanning system for a camera or the like, comprising a vertical support for an object to be scanned, a stationary horizontal framework carried by said support, a carriage movable along said framework, a first motor driving said carriage along said framework, a lamp fixture carried by said carriage in a first straight horizontal path parallel to said support, said lamp fixture having a first lamp arranged to project a long narrow light beam in a straight vertical image line across said object, a stationary film holder spaced from said support for holding photographic film in a vertical plane parallel to said support, a second stationary horizontal framework adjacent to said film holder, another carriage movable along the second framework, a second motor driving said other carriage along the other framework, a shutter plate carried by said other carriage in a path parallel to said film holder and adjacent thereto, said plate having a vertical slit therein disposed parallel to said vertical image line, a lens, means supporting said lens between said shutter plate and object for focusing said image line through said slit on said film in all positions of the image line on said object and in all positions of the slit with respect to the copy holder, a power supply circuit, and circuit means connecting said motors in said circuit so that the motors drive the carriages in opposite directions at coordinated speeds, a telescopic arm pivoted on an axis perpendicular to the optic axis of said lens, said arm having opposite ends pivotally connected to the shutter plate and lamp fixture for suppressing relative oscillations of the shutter plate and lamp fixure due to errative variations in relative speeds of the motors.

7. A scanning system for a camera or the like, comprising a vertical support for an object to be scanned, a stationary horizontal framework carried by said support, a carriage movable along said framework, a first motor driving said carriage along said framework, a lamp fixture carried by said carriage in a first straight horizontal path parallel to said support, said lamp fixture having a first lamp arranged to protect a long narrow light beam in a straight vertical image line across said object, a stationary film holder spaced from said support for holding photographic film in a vertical plane parallel to said support, a second stationary horizontal framework adjacent to said film holder, another carriage movable along the second framework, a second motor driving said other carriage along the other framework, a shutter plate carried by said other carriage in a path parallel to said film holder and adjacent thereto, said plate having a vertical slit therein disposed parallel to said vertical image line, a lens, means supporting said lens between said shutter plate and object for focusing said image line through said slit on said film in all positions of the image line on said object and in all positions of the slit with respect to the copy holder, a power supply circuit, and means for adjusting the spacing of said object with respect to the film holder, means of adjusting the position of said lens between the film holder and object for focusing said image line on the film, and circuit means connecting said motors in said circuit so that the motors drive the carriages in opposite directions at coordinated speeds depending on the relative spacing of said object and lens with respect to said film holder, a telescopic arm pivoted on an axis perpendicular to the optic axis of said lens, said arm having opposite ends pivotally connected to the shutter plate and lamp fixture for suppressing relative oscillations of the shutter plate and lamp fixture due to erratic variations in relative speeds of the motors.

8. A scanning system for a camera or the like, comprising a vertical support for an object to be scanned, a stationary horizontal framework carried by said support, a carriage movable along said framework, a first motor driving said carriage along said framework, a lamp fixture carried by said carriage in a first straight horizontal path parallel to said support, said lamp fixture having a first lamp arranged to project a long narrow light beam in a straight vertical image line across said object, a stationary film holder spaced from said support for holding photographic film in a vertical plane parallel to said support, a second stationary horizontal framework adjacent to said film holder, another carriage movable along the second framework, a second motor driving said other carriage along the other framework, a shutter plate carried by said other carriage in a path parallel to said film holder and adjacent thereto, said plate having a vertical slit therein disposed parallel to said vertical image line, a lens, means supporting said lens between said shutter plate and object for focusing said image line through said slit on said film in all positions of the image line on said object and in all positions of the slit with respect to the copy holder, a power supply circuit, and circuit means connecting said motors in said circuit so that the motors drive the carriages in opposite directions at coordinated speeds, a telescopic arm pivoted on an axis perpendicular to the optic axis of said lens, said arm having opposite ends pivotally connected to the shutter plate and lamp fixture for suppressing relative oscillations of the shutter plate and lamp fixture due to erratic variations in relative speeds of the motors, a projection lamp carried by said lamp fixture directing another beam oppositely from said long narrow beam, a photoelectric cell movable with said shutter plate in a third path for receiving light from the projecting lamp, said photoelectric cell being connected in a circuit, including a power supply for said lamp fixture, first motor and second motor, whereby said power supply is cut off to extinguish the light of the lamp fixture and to stop the motors when the light from said projection lamp moves off said photoelectric cell during relative movement of the shutter plate and lamp fixture.

9. A scanning system for a camera or the like, comprising a vertical support for an object to be scanned, a stationary horizontal framework carried by said support, a carriage movable along said framework, a first motor driving said carriage along said framework, a lamp fixture carried by said carriage in a first straight horizontal path parallel to said support, said lamp fixture having a first lamp arranged to project a long narrow light beam in a straight vertical image line across said object, a stationary film holder spaced from said support for holding photographic film in a vertical plane parallel to said support, a second stationary horizontal framework adjacent to said film holder, another carriage movable along the second framework, a second motor driving said other carriage along the other framework, a shutter plate carried by said other carriage in a path parallel to said film holder and adjacent thereto, said plate having a vertical slit therein disposed parallel to said vertical image line, a lens, means supporting said lens between said shutter plate and object for focusing said image line through said slit on said film in all positions of the image line on said object and in all positions of the slit with respect to the copy holder, power supply circuit, means for adjusting the spacing of said object with respect to the film holder, means for adjusting the position of said lens between the film holder, and object for focusing said image line on the film, and circuit means connecting said motors in said circuit so that the motors drive the carriages in opposite directions at coordinated speeds depending on the relative spacing of said object and lens with respect to said film holder, a telescopic arm pivoted on an axis perpendicular to the optic axis of said lens, said arm having opposite ends pivotally connected to the shutter plate and lamp fixture for suppressing relative oscillations of the shutter plate and lamp fixture due to erratic variations in relative speeds of the motors, a projection lamp carried by said lamp fixture directing another beams oppositely from said long narrow beam, a photoelectric cell movable with said shutter plate in a third path for receiving light from the projection lamp, said photoelectric cell being connected in a circuit including a power supply for said lamp fixture, the first motor and the second motor, whereby said power supply is cut off to extinguish the light of the lamp fixture and the motors stop when the light from said projection lamp moves off said photoelectric cell during relative movement of the shutter plate and lamp fixture.

References Cited
UNITED STATES PATENTS

| | | | |
|---|---|---|---|
| 2,153,186 | 4/1939 | Henderson | 88—24 |
| 3,066,572 | 12/1962 | Bubna-Littitz | 88—24 |

NORTON ANSHER, *Primary Examiner.*

R. A. WINTERCORN, *Assistant Examiner.*